June 10, 1924.
O. JANSSEN
1,497,445
TRANSMISSION GEARING
Filed Feb. 11, 1921
4 Sheets-Sheet 3
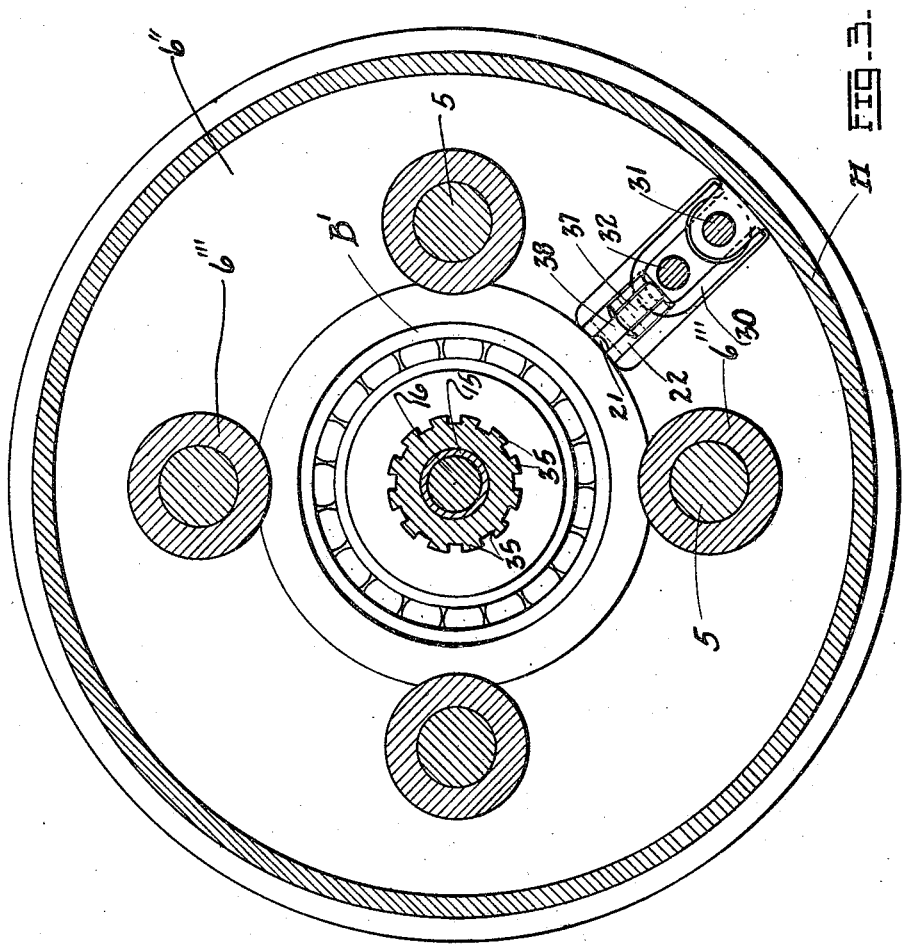
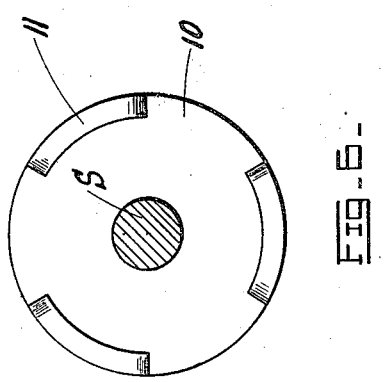
INVENTOR
Oscar Janssen
BY
ATTORNEY June 10, 1924. 1,497,445
O. JANSSEN
TRANSMISSION GEARING
Filed Feb. 11, 1921 4 Sheets-Sheet 4

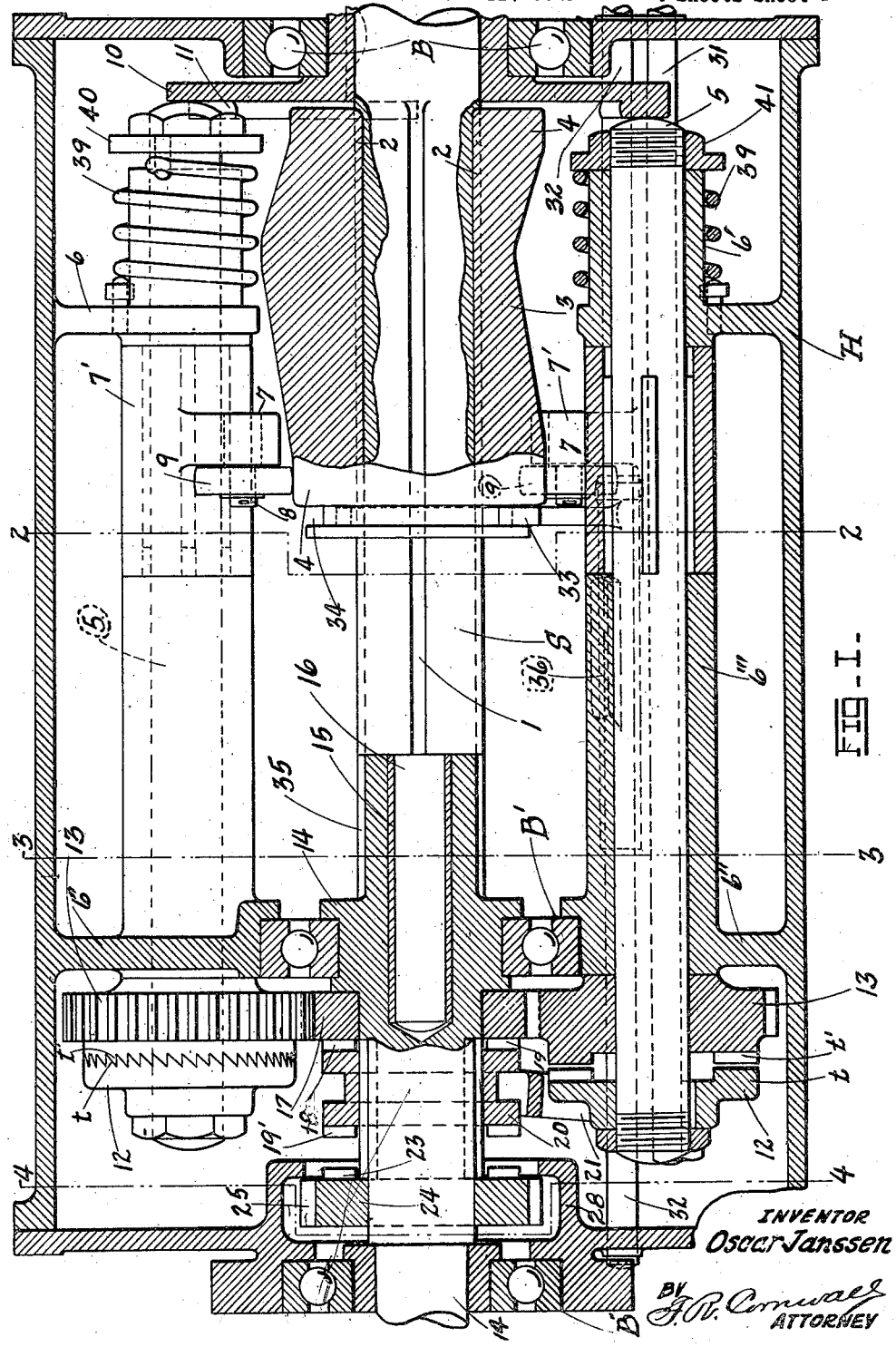

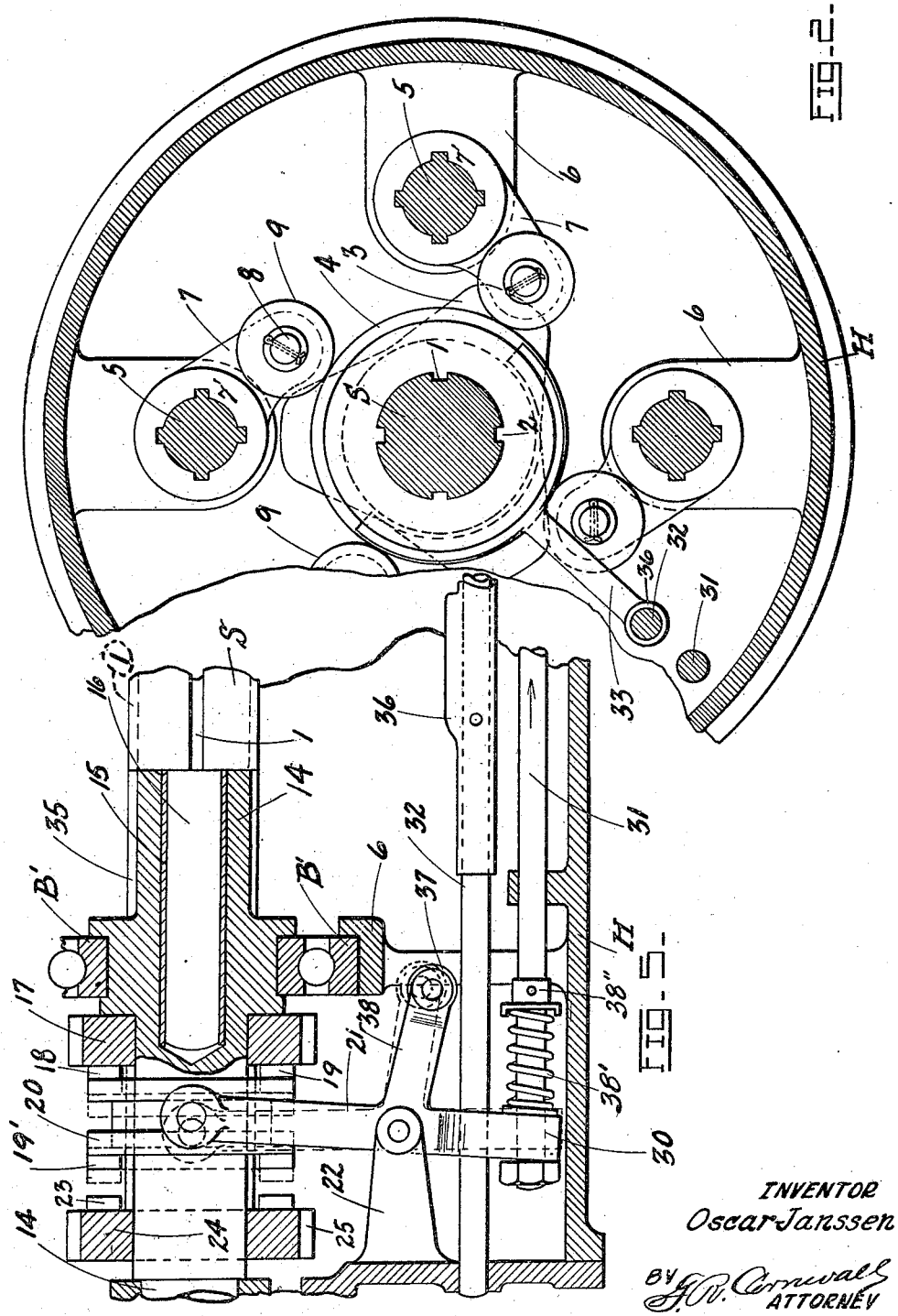

INVENTOR
Oscar Janssen
BY
ATTORNEY.

Patented June 10, 1924.

1,497,445

UNITED STATES PATENT OFFICE.

OSCAR JANSSEN, OF ST. LOUIS, MISSOURI, ASSIGNOR TO CHARLES O. JANSSEN, OF ST. LOUIS, MISSOURI.

TRANSMISSION GEARING.

Application filed February 11, 1921. Serial No. 444,139.

*To all whom it may concern:*

Be it known that I, OSCAR JANSSEN, a citizen of the United States, residing at St. Louis, Missouri, have invented a certain new and useful Improvement in Transmission Gearing, of which the following is a full, clear, and exact description, such as will enable others skilled in the art to which it appertains to make and use the same, reference being had to the accompanying drawings, forming part of this specification.

My invention has relation to improvements in transmission mechanism and consists in the novel features of construction more fully set forth in the specification and pointed out in the claims.

The object of my invention is to provide a transmission mechanism more particularly adapted for use in motor vehicles where it is desired to change speed often and easily. To accomplish this result I employ as my initial driving member a three-lobed cam which is slidable with relation to the impulse arms thereby varying the throw of said impulse arms and speed of the driven shaft.

A further object is to provide a transmission mechanism wherein the driving is accomplished by the movement of a single driving member.

A further object is to provide a transmission mechanism of the class hereinafter described, which shall also embody mechanism for reversing the direction of rotation of the driven member.

A further object is to provide a transmission mechanism wherein the driven member is indirectly driven for speeds other than maximum speed and when such maximum speed is obtained, the driving will be direct.

Further and other advantages will be better apparent from a detailed description of the invention, in connection with the accompanying drawings, in which—

Figure 1 is a middle longitudinal section through the housing, parts of the mechanism being left in elevation.

Figure 2 is a vertical cross section on the line 2—2 of Figure 1.

Figure 3 is a vertical cross section on the line 3—3 of Figure 1.

Figure 5 is a sectional detail through the reverse gears showing the gear shift lever applied thereto, said lever being in elevation.

Figure 8 is a diagrammatic development of the rib formation on the driven shaft which is adapted to cooperate with the ribs on the driving member.

Figure 4:
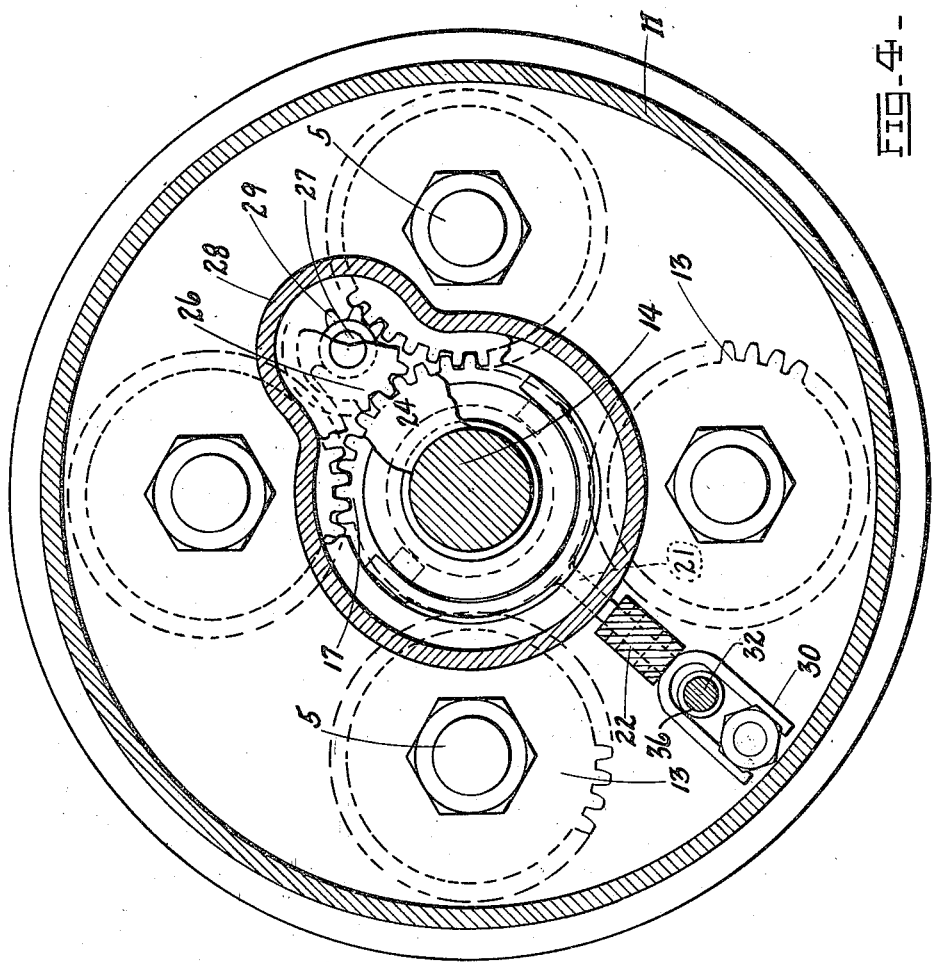
Figure 4 is a vertical cross-section on the line 4—4 of Figure 1.

Referring to the drawings, H represents the housing of my improved transmission mechanism and B represents a ball bearing wherein one end of a driving shaft S is adapted to rotate. The driving shaft S is provided with grooves or keyways 1 wherein corresponding ribs 2 on the driving member or cam 3 are adapted to slide. The driving member 3 is in the shape of a three-lobed cam and has near its outer ends concentric surfaces 4 which may be termed neutral zones on the cam 3. Disposed about the cam 3 are a series of countershafts 5 (four being shown in the present instance) mounted in bearings projecting from the inside of the housing H. These bearings are in the form of inwardly projecting arms 6 at one end of the housing, at the right Figure 1 (see also Figure 2) or in the form of an inwardly extending flange 6″ at the left of figure (see also Figure 3), each of which has an elongated sleeve or hollow bearing portion 6′ and 6‴, respectively (see Figure 1), these sleeve portions of a pair of bearings being in alignment to provide an extended mount for the countershafts 5. On each counter shaft 5 is fixedly mounted a sleeve 7′ carrying a rocker arm 7 and projecting from each rocker arm 7 is a stud 8 carrying a roller 9. A cam plate 10 is keyed to the shaft S adjacent to one end of the cam 3, said cam plate 10 being provided with cam formations 11 suitably spaced apart so that on rotation of the cam plate 10 with the shaft S, these formations will at predetermined intervals engage the adjacent ends of the countershafts 5 and impart to them a momentary reciprocation, the object of which will presently appear.

On the end of each counter shaft 5 opposite the cam plate 10, is keyed a ratchet disk 12, the teeth *t* of which are adapted to engage complementary teeth $t'$ laterally projecting from a spur gear 13 said teeth $t$ and $t'$ forming clutches. The spur gear 13 is freely rotatable on the shaft 5 and at the intervals when the shaft 5 is cammed leftward in Figure 1 by the cam formations 11, the ratchet disks 12 will be disengaged from the gears 13. B' and B'' are bearings in which the driven shaft 14 is mounted. The driven shaft 14 is provided with an internal bearing lined by a bushing 15 into which projects the reduced portion 16 of the driving shaft S. It is thus seen that the driven shaft 14 has its bearing in the housing while the driving shaft S has its bearing at the outer end, in the housing and at the inner end in the driven shaft.

Mounted on the driven shaft and engaging with the spur gears 13 is a pinion 17, said pinion 17 being freely rotatable on the shaft 14, and being provided with laterally projecting teeth 18 adapted to engage with the adjacent teeth 19 of a clutch member 20 which is feathered on the shaft 14 and said clutch member being also provided with laterally projecting teeth 19' on the face opposite the teeth 19 to engage with the teeth 23 on a reversing gear 24.

Figures 6, 7:
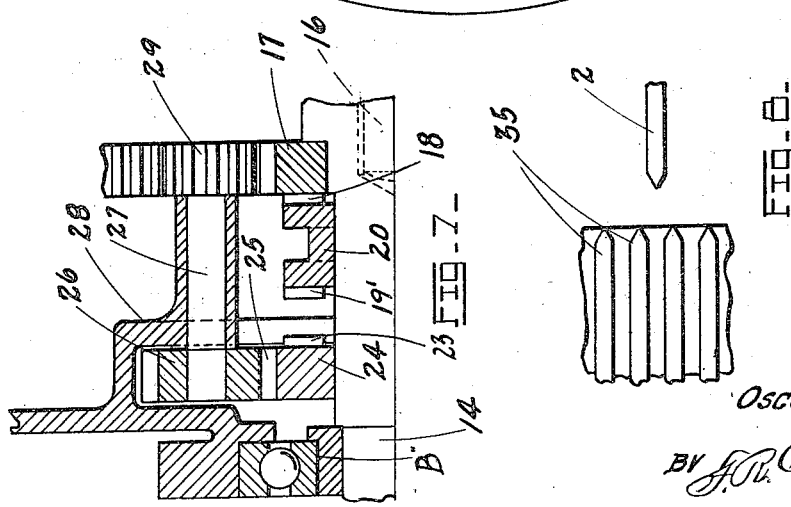
Figure 6 is a face view of the cam plate whereby the driving ratchets are disengaged on their return movement.
Figure 7 is a sectional detail of the reversing gears.

When it is desired to reverse the direction of the driven shaft 14, the reversing clutch member 20 may be shifted by means of a shift lever 21 pivoted on a bracket 22, so as to cause the teeth 19' to engage with teeth 23 on gear 24. The gear 24 in addition to the teeth 23 is provided with peripheral teeth 25 which are in engagement with the teeth of a pinion 26, mounted on a countershaft 27 arranged in a housing 28, the counter shaft 27 having a second pinion 29 mounted on its extremity opposite the pinion 26 (see Figure 7). The pinion 29, as will be seen in Figure 4, is constantly in mesh with one of the gears 13, and the pinion 26 is constantly in mesh with gear 24. The gear shift lever 21 is provided with a fork 30 at its lower end through which extends a rod 31, which rod is pedally actuated so as to shift the clutch 20, the pedals not being shown.

When it is desired to impart rotation to the driven shaft 14, the cam 3 is advanced or moved leftwardly along the shaft S from the position shown in Figure 1, by means of a pedally operated rod 32, which rod has fixed to it a shift arm 33 positioned within a groove 34 in the cam 3. It is thus seen that by advancing the rod 32, the shift arm 33 will carry forward the cam 3, thus bringing points of the three-lobed cam of constantly increasing throw opposite the rollers 9. The rollers 9, together with their arms 7, will be intermittently rocked a distance depending upon the throw, incident to the amount cam 3 has been shifted; and in being so rocked will impart a partial rotation to each of the shafts 5, this movement being communicated to the teeth $t$ of disks 12, and ultimately to gears 13, and pinion 17 will receive this motion. Through the pinion 17, motion will be communicated to the clutch member 20 and to the driven shaft 14.

When the cam 3 has been advanced so as to impart to the rock arms 7 their maximum throw, the cam 3 will be immediately adjacent to the driven shaft 14 and upon a slightly further advance movement, the cam 3 will slide over said driven shaft, and the ribs 2 of the cam will enter the spaces between the rib formations 35 on the driven shaft, thus imparting a direct driving movement to the driven shaft.

Obviously, when the driven shaft is thus directly driven, the pinion 17 and clutch 20 must be disengaged. This disengagement is brought about by providing a cam surface formation 36 on the rod 32 (see Figure 5), which cam formation will engage a roller 37 mounted on the extremity of an arm 38 projecting from the shift lever 21. As the cam surface 36 raises the arm 38, the lever 21 will be oscillated an amount sufficient to shift the clutch 20 to a neutral position, thus preventing any movement of the rocker arms being imparted to the driven shaft 14 and vice versa. Upon releasing the rod 32 (or moving it rightwardly), the lever 21 will be restored to normal position under the influence of a spring 38' on rod 31, said spring bearing against the fork 30 of the lever and also against a stop 38'' on the rod 31.

When it is desired to reverse the direction of rotation of the driven shaft 14, the rod 31 is actuated in the direction of the arrow, Figure 5, thereby oscillating the lever 21 in the proper direction to shift the clutch 20 so that its teeth 19' will engage the teeth 23 of the gear 24.

We have seen that the gear 24 is meshed with pinion 26 on a shaft 27 which also carries a pinion 29, the latter pinion being in constant engagement with one of the gears 13, whose motion is imparted to it through the rock arm 7. The motion of this gear 13 will now be imparted through the pinions 29 and 26 to the gear 24, and thence to the clutch 20 whereupon the driven shaft 14 will be driven in a direction opposite to that when it receives its motion directly through the gear 17. Gear 17 being loosely mounted on the driven shaft will, of course, be constantly rotated by the successive impulses from the rocker arms 7, and, of course, all of the gears 13 in mesh therewith are similarly rotated, and, therefore, it makes no difference from which one of the gears 13 the reversing mechanism just described is driven.

It is obvious that when the rocker arms 7 have been rocked in a direction to drive the driven shaft, some means must be provided for returning said rocker arms to their original or normal positions, and this is accomplished by coiled torsion springs 39 around the sleeve 6' of bearings 6, one end of each spring being secured to the bearing arm 6 while the other end is secured to a flange 40 forming part of a nut 41 threaded to the shaft 5. The spring 39 in addition to restoring the rocker arms to their normal positions after they have been actuated, likewise operates to force the shaft 5 into engagement with cam plate 10, said spring being compressed at such times as the shaft 5 is reciprocated under the influence of the cam formations 11.

While I have shown certain details of construction for the purpose of illustrating my invention, I do not wish to be restricted to these precise details, as it is obviously within the skill of a mechanic to vary them as occasion or special conditions require.

What I claim is:

1. In a transmission mechanism, a driving shaft, a driving member slidably mounted on said shaft, a counter shaft provided with a rocker arm, said rocker arm having a roller adapted to engage the periphery of the driving member, a gear wheel and clutch mechanism mounted on the counter shaft, a driven shaft provided with a gear and clutch mechanism whereby said shaft may be connected to the gear wheel, and suitable clutch formations on the driven shaft and driving member whereby said shaft and member may be clutched together when said driving member has been moved its maximum distance.

2. In a transmission mechanism, a driving shaft, a driving member on said shaft having a plurality of peripheral cam surfaces and a neutral zone, a counter shaft provided with a rocker arm terminating in a roller adapted to ride on the periphery of the driving member, a gear wheel loosely mounted on said counter shaft, a clutch member feathered on said counter shaft and adapted to engage with said gear wheel, means cooperating with the driving shaft to timely disengage said clutch member from its gear wheel when the rocker arm is on its return oscillation, a driven shaft and means for engaging the same with the aforesaid gear wheel and means for directly engaging the driving member with the driven shaft.

3. In a transmission mechanism, a driving shaft, a driving member on said shaft having a plurality of peripheral cam surfaces, a plurality of counter shafts provided with rocker arms each terminating in a roller, means for relatively shifting said driving member with relation to said rollers whereby the rocker arms are oscillated to variable distance from zero to maximum depending upon the relative positions of said driving member and rollers, a gear loosely mounted on each counter shaft and a clutch fixed to each counter shaft and normally adapted to engage said gear, a driven shaft adapted to be driven by said gears, means cooperating with the driving shaft for disengaging said clutch and gear when the rocker arm is on its return oscillation, and means for engaging the driving member with the driven shaft when said driving member is positioned to impart to the rocker arms their maximum throw.

4. In a transmission mechanism, a driving shaft, a driving member on said shaft having a plurality of peripheral cam surfaces, a counter shaft, a rocker arm mounted thereon for co-operation with said cam surfaces, a driving gear loosely mounted on said counter shaft, a clutch member on the driving shaft normally engaging said gear, means for opportunely disengaging said clutch member from said gear, and a driven shaft adapted to be rotated by said gear.

5. In a transmission mechanism, a driving shaft, a driving member on said shaft having a plurality of peripheral cam surfaces, a counter shaft provided with a rocker arm terminating in a roller adapted to ride on the periphery of the driving member, a gear wheel loosely mounted on said counter shaft, a clutch member feathered on said counter shaft and normally adapted to engage with said gear wheel, a cam plate provided with cam formations cooperating with the driving shaft to timely disengage said clutch member from its gear wheel when the rocker arm is on its return oscillation, a driven shaft, and means for engaging the same with the aforesaid gear wheel.

6. In a transmission mechanism, a driving shaft, a driving member on said shaft having a plurality of peripheral cam surfaces, a plurality of counter shafts each having a rocker arm mounted thereon for co-operation with said cam surfaces, driving gears loosely mounted on said counter shafts, clutch members on the counter shafts normally engaging said gears, means for disengaging said clutch member from said driving gears, a driven shaft, a pinion mounted thereon adapted to be rotated by said driving gears, and means for reversing the direction of rotation of said driven shaft.

In testimony whereof I hereunto affix my signature this 7th day of February, 1921.

OSCAR JANSSEN.